United States Patent
Hassbring et al.

(10) Patent No.: US 12,450,876 B2
(45) Date of Patent: Oct. 21, 2025

(54) METHODS, SYSTEMS AND NON-TRANSITORY COMPUTER-READABLE STORAGE MEDIUMS FOR DETECTING AN OBJECT OF A FIRST OBJECT TYPE IN A VIDEO SEQUENCE

(71) Applicant: Axis AB, Lund (SE)

(72) Inventors: Ludvig Hassbring, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 25 days.

(21) Appl. No.: 18/616,836

(22) Filed: Mar. 26, 2024

(65) Prior Publication Data

US 2024/0362893 A1  Oct. 31, 2024

(30) Foreign Application Priority Data

Apr. 25, 2023 (EP) .................................... 23169689

(51) Int. Cl.
 *G06V 10/764* (2022.01)
 *G06T 7/194* (2017.01)
(52) U.S. Cl.
 CPC ............ *G06V 10/764* (2022.01); *G06T 7/194* (2017.01); *G06T 2207/10016* (2013.01)
(58) Field of Classification Search
 CPC combination set(s) only.
 See application file for complete search history.

(56) References Cited

U.S. PATENT DOCUMENTS

| | | |
|---|---|---|
| 2011/0026812 A1 | 2/2011 | Ikeda |
| 2016/0125245 A1 | 5/2016 | Saitwal et al. |
| 2018/0341813 A1 | 11/2018 | Chen et al. |
| 2019/0043403 A1 | 2/2019 | Van Droogenbroeck et al. |

(Continued)

FOREIGN PATENT DOCUMENTS

| | | |
|---|---|---|
| CN | 111062974 A | 4/2020 |
| CN | 114359268 A | 4/2022 |

(Continued)

OTHER PUBLICATIONS

Gurwicz, Y., et al., "Multiclass object classification for real-time video surveillance systems", Pattern Recognition Letters, (2011).

(Continued)

*Primary Examiner* — Mia M Thomas
(74) *Attorney, Agent, or Firm* — Volpe Koenig (57) ABSTRACT

The present disclosure relates to methods, systems and non-transitory computer-readable storage mediums for detecting an object of a first object type in a video sequence. A first algorithm is used to detect areas or objects in the scene as captured in the video stream that have an uncertain object type status. A second algorithm is used to provide a background model of the video sequence. For areas or objects having the uncertain object type status, the background model is used to check if the area or object is considered to be part of the background or the foreground in the video sequence. If the area or object is determined to belong to the foreground, the area or object is classified as the first object type. If the area or object is determined to not belong to the foreground, the area or object is not classified as the first object type.

14 Claims, 6 Drawing Sheets

(56) References Cited

U.S. PATENT DOCUMENTS

| | | | |
|---|---|---|---|
| 2019/0253626 A1* | 8/2019 | Li | H04N 23/695 |
| 2019/0325611 A1* | 10/2019 | Takeda | G06T 7/90 |
| 2020/0193619 A1* | 6/2020 | Danielsson | G06T 7/248 |
| 2021/0097695 A1 | 4/2021 | Lundberg et al. | |
| 2024/0404014 A1* | 12/2024 | Hassbring | G06T 7/20 |

FOREIGN PATENT DOCUMENTS

| | | | |
|---|---|---|---|
| EP | 3246874 B1 * | 3/2018 | G06T 7/254 |
| EP | 3438929 A1 | 2/2019 | |
| WO | 2022153476 A1 | 7/2022 | |

OTHER PUBLICATIONS

Sumi, K., et al., "Object detection—Model of foreground and background", IPSJ SIG Technical Reports, (2005).

Extended European Search Report issued on Nov. 15, 2023 for European Patent Application No. 23169689.9.

Piccardi. "Background subtraction techniques: a review." In 2004 IEEE international conference on systems, man and cybernetics (IEEE Cat. No. 04CH37583) (vol. 4, pp. 3099-3104) (Oct. 10, 2004).

Wojke et al., "Simple online and realtime tracking with a deep association metric." In 2017 IEEE international conference on image processing (ICIP) (pp. 3645-3649). IEEE.(2017).

Korean Office Action issued on Sep. 4, 2025 for Korean Patent Application No. 20240040241.

* cited by examiner

METHODS, SYSTEMS AND NON-TRANSITORY COMPUTER-READABLE STORAGE MEDIUMS FOR DETECTING AN OBJECT OF A FIRST OBJECT TYPE IN A VIDEO SEQUENCE

TECHNICAL FIELD

The present invention relates to object detection and in particular to methods, systems and non-transitory computer-readable storage mediums for detecting an object of a first object type in a first image frame of a plurality of image frames in a video sequence capturing a scene.

BACKGROUND

Object detection in video monitoring systems has evolved over the years as an essential component for various applications such as security, traffic monitoring, retail analysis, and smart cities. The primary goal of these systems is to identify and track objects of interest, such as people, vehicles, or animals, within a video stream.

Object classification is often an integral component of an object detection system. Object detection involves identifying objects of interest within an image or video frame and assigning them to specific categories or classes. The combination of object localization (finding the object's location) and object classification (identifying the object's class) enables a complete object detection system.

One problem with object detection systems is wrongly classified objects, i.e., false positives or false negatives. Such classifications may for example have a negative impact on user experience. In a system where human operators review or interact with the video output, wrongly classified objects may lead to confusion, fatigue, and frustration. This may reduce user trust in the system and may cause the operator to miss genuine objects of interest due to the increased number of false alarms.

There is thus a need for improvements in this context.

SUMMARY

In view of the above, solving or at least reducing one or several of the drawbacks discussed above would be beneficial, as set forth in the attached independent patent claims.

According to a first aspect of the present invention, there is provided a method for detecting objects of a first object type in a first image frame of a plurality of image frames in a video sequence capturing a scene, the method comprising: for each image frame of the plurality of image frames: analysing the image frame using a first algorithm to identify objects of the first object type in the image frame, the first algorithm calculating, for each area of a plurality of areas in the scene, a probability of the image data corresponding to the area being part of an object of the first object type in the image frame, the first algorithm having a probability threshold to determine whether image data is part of the object of the first object type, and storing an indicator of a difference between the probability of the image data being part of an object of the first object type and the probability threshold in a list of indicators associated with the area.

The method further comprises detecting objects of the first object type in the first image frame, the first image frame being a last image frame among the plurality of image frames, wherein the detecting comprises: providing a background model of the video sequence, the background model defining, for each area of the plurality of areas in the scene, whether the image data corresponding to the area in the first image frame belongs to a background or a foreground, the background model being defined by applying a second algorithm different to the first algorithm to at least some of the plurality of image frames; for each area of the scene, identifying whether the image data corresponding to the area in the first image has an uncertain object type status based on the associated list of indicators; upon identifying that an image data has an uncertain object type status: upon the background model defining the image data as belonging to the background in the first image, determining that the image data is not part of an object of the first object type; upon the background model defining the image data as belonging to the foreground in the first image, determining that the image data is part of an object of the first object type.

In an object classification application designed to detect a specific object type, it may be problematic when an object's class alternates between frames. Some objects might have appearances similar to a target object type, causing the classification algorithm to produce fluctuating probabilities. These probabilities may surpass a threshold, classifying the object as the target type in one frame, and then drop below the threshold, classifying it as a different type in the next frame. Factors contributing to these changes may include the object's viewing angle, image sensor noise, minor alterations in segmentation mask determination, or variations in the object's appearance.

Such inconsistent classifications may lead to confusion for operators monitoring the output and may negatively impact system performance, decision-making, and privacy, among other issues.

Advantageously, using two different algorithms for determining an object type may increase the robustness of the present method. The second algorithm, providing the background model of the video sequence, may be seen as a backup for the case where the first algorithm outputs different assessments (probabilities over and under the probability threshold) over the plurality of image frames for corresponding image content. Such fluctuating output among the plurality of image frames for a particular area of the scene may lead to that the area of the scene as depicted in a currently processed image frame (referred to as a first image frame, being the latest one in the video sequence) gets an "uncertain object type status". By using preceding frames in the video sequence to determine if an area of the scene as depicted in the first frame (i.e., the image data depicting the area in the first frame) should get an uncertain object type status or not, prediction of future states is avoided, thus resulting in a low complexity and robust method.

It is important to clarify that the term "first image frame" used herein does not refer to the order of the frames in a video sequence. Rather, it is simply a means of distinguishing one frame from another for the purpose of describing or claiming the invention. The order of the frames in the sequence is determined by their temporal relationship to each other, with the first frame being captured or displayed before the second frame, and so on, until the last frame is reached.

By the term "uncertain object type status" should, in the context of the present specification, be understood that the output from the first algorithm, while analysing the plurality of image frames, results in a mix of classification results, for example that an area of the scene as depicted in some of the image frames is classified as not being part of an object of the first object type, while in other of the image frames, the area is classified as being part of the object of the first object type.

The extent of the mix that results in the uncertain object type status, e.g., ratio between the positive and negative classifications, difference in size of difference between the probability of the image data being part of an object of the first object type and the probability threshold, etc., depends on the use case and the requirement of the application.

When the uncertain object type status has been determined for a particular image data of the first image, the background model is used to determine if an object of the first object type has been detected in the image data or not.

Advantageously, with the present method, false positive identifications of static objects being similar in appearance to an object of the first object type may be avoided, since the background model may determine that the image data depicting the static object in the first image frame belongs to the background. Additionally, the background model can prevent false negative identifications of moving objects belonging to the first object type, even when their appearance in one or more of the image frames does not match the assessment criteria of the first algorithm. This is because the background model can determine that the image data representing the moving object in the first image frame belongs to the foreground, thus avoiding false negative identifications.

Additionally, the list of indicators can be updated continuously as new image frames are added to the video sequence, potentially using a First In, First Out (FIFO) approach. As a result, the method can effectively accommodate new objects or other scene changes captured within the video sequence.

In some embodiments, the method further comprising the steps of: upon identifying an image data as not having an uncertain object type status: upon the first algorithm determining that image data is part of the object of the first object type, determining that the image data is part of an object of the first object type; upon the first algorithm determining that image data is not part of the object of the first object type, determining that the image data is not part of an object of the first object type.

In other words, if the image data in the first image is not identified as a having an uncertain object type status, the output from the first algorithm for the image data is trusted, and the image data is determined to be part of an object of the first object type in case the first algorithm has made this assessment. Advantageously, a consistent assessment from the first algorithm is relied upon, and false positives and false negatives may be avoided.

In some examples, the step of identifying whether the image data has an uncertain object type status in the first image comprises: determining, based on the associated list of indicators, whether an absolute value of the difference between the probability of the image data is part of an object of the first object type and the probability threshold exceeds a threshold difference; upon the difference exceeding the threshold difference, determining that the image data does not have an uncertain object type status; upon the absolute value of the difference not exceeding the threshold distance, determining a distribution measurement between the indicators in the associated list of indicators that indicates a positive difference, and the indicators in the associated list of indicators that indicates a negative difference; upon the distribution measurement indicating a mix of positive and negative differences included in an uncertainty range, determining that the image data has an uncertain object type status, and otherwise determining that the image data does not have an uncertain object type status.

Advantageously, in case the first algorithm is certain enough (difference between the probability of the image data in the first image is part of an object of the first object type and the probability threshold exceeds a threshold difference) in its assessment of the image data of the first image, this assessment is relied upon, and the image data is not considered to have an uncertain object type status. This embodiment may reduce the complexity of the method since investigation of the remaining list of indicators (i.e., assessments made for previous frames) and checking of the background model are not needed in case the first algorithm assesses a high enough, or low enough probability for the image data of the first image being part of the object of the first object type. Moreover, false positives and false negatives may be avoided.

The threshold difference may depend on the requirements of the application implementing the method, and/or on reliability metrics of the first algorithm. The threshold difference may for example be set to 0.3 on a scale from 0-1. If the probability threshold is 0.5, this means that a probability of 0.8 or higher, or 0.2 and lower are considered "high enough", or "low enough" respectively. Other threshold differences are equally possible and depend on the use case.

In case the first algorithm is not certain enough, the list of indicators is analysed to determine if the image data is to be considered to have an uncertain object type status or not. The distribution between positive and negative differences is analysed using any suitable statistical method, for example determining the ratio between the negative and the positive values, the average value in the list, the median value in the list, the sum of the values in the list, etc. In case the distribution measurement is included in an uncertainty range, the image data is considered to have an uncertain object type status, otherwise the image data is not considered to have an uncertain object type status.

Since the list indicates positive and negative differences, and the first algorithm can be classifying the image data in two classes (first object type or not first object type) the uncertainty range typically comprises a low and a high threshold. For example, in case a ratio is determined, the uncertainty range may indicate a mix between a 20/80 distribution and an 80/20 distribution of the indicators that indicate a positive difference, and the indicators that indicate a negative difference. This means that if the ratio is between 20/80 and 80/20 (such as 20/80, 30/70, 50/50, 60/40, 80/20, but not 100/0, 0/100, 10/90 or 95/5), the image data is considered as uncertain. Any other suitable ratios for the thresholds of the range may be used, such as 10/90, 25/75 etc. In case an average value is used, the uncertainty range may comprise a lower value of −0.2 and a higher value of 0.3, such that an average value between −0.2 and +0.3 is considered as uncertain but not values outside that range (such as −0.3, +0.35, etc.)

In some embodiments, the step of identifying whether the image data has an uncertain object type status in the first image comprises: determining a distribution measurement between the indicators in the associated list of indicators that indicates a positive difference, and the indicators in the associated list of indicators that indicates a negative difference, upon the distribution measurement indicating a mix of positive and negative differences included in an uncertainty range, determining that the image data has an uncertain object type status, and otherwise determining that the image data does not have an uncertain object type status.

In this embodiment, the list of indicators is always analysed, which may provide a more reliable assessment for an image data. Moreover, this embodiment allows for the list of indicators to be a list of binary values, wherein a positive difference is indicated by a first value of a binary value, and a negative difference is indicated by a second value of a binary value. This may reduce the complexity of the method, both for storing the list of indicators, as well as determining the distribution measurement of the list.

In some embodiments, the first algorithm comprises a feature extraction process to extract features of objects within an image and represent them as a vector of numbers. This means that the first algorithm may comprise an artificial intelligence (AI) or machine learning (ML) algorithm trained to detect objects of the first object type in an image. AI/ML is a suitable technology for classifying objects in an image and may relatively easily be trained with a large dataset of images that are labelled with the object of interest. Suitable AI/ML algorithms include Haar cascades, Histogram of Oriented Gradients (HOG), Local Binary Pattern Histogram (LBPH), Convolutional Neural Networks (CNNs) and Transformer type models (which take sequential data such as a video stream as input).

In some embodiments, the second algorithm is a motion-based background detection algorithm. Examples of such algorithms include using temporal average filters, frame differencing methods, mean filters, running gaussian averages and background mixture models (such as Gaussian mixture models, GMM). Other possible algorithms include Adaptive Multi-Band Binary (AMBB) algorithms and optical flow methods. Using a motion-based background detection algorithm may provide a good backup algorithm in case the first algorithm outputs uncertain results as discussed above.

In some embodiments, the list of indicators associated with an area is a FIFO-list with 5-15 values. In other embodiments, the FIFO-list may have more values, such as 20, 30, etc. Using a FIFO data structure may provide a simple, efficient, and effective way to calculate distribution measurement as discussed herein, particularly in real-time applications where new data points are continuously being added.

In some embodiments, the method further comprises masking or highlighting, in the first image, image data determined to be part of an object of the first object type. When dealing with these types of applications, it can be frustrating for an operator if a certain object is masked or highlighted in one frame, but not in the next. This inconsistency can be bothersome and draw unnecessary attention. Additionally, in masking applications, there is a potential privacy concern if an object is only sometimes masked. The present method may solve or at least reduce one or several of these drawbacks.

In some embodiments, the method is implemented in a camera, wherein the video sequence is part of a live video stream captured by the camera.

According to a second aspect of the present invention, there is provided a method for detecting objects of a first object type in a first image frame of a plurality of image frames in a video sequence capturing a scene, the scene comprising a plurality of objects tracked in the plurality of image frames, the method comprising: for each image frame of the plurality image frames: analysing the image frame using a first algorithm to identify objects of the first object type in the image frame, the first algorithm calculating, for each object of the plurality of objects tracked in the image frame, a probability of the object being an object of the first object type, the first algorithm having a probability threshold to determine whether the object is an object of the first object type, and storing an indicator of a difference between the probability of the object being an object of the first object type and the probability threshold in a list of indicators associated with the object.

The method further comprises detecting objects of the first object type in the first image frame, the first image frame being a last image frame among the plurality of image frames, wherein the detecting comprises: providing a background model of the video sequence, the background model defining, for each area of a plurality of areas in the scene, whether the image data corresponding to the area in the first image frame belongs to a background or a foreground, the background model being defined by applying a second algorithm different to the first algorithm to at least some of the plurality of image frames.

The method further comprises, for each object of the plurality of objects tracked in the first image, identifying whether the object has an uncertain object type status based on the list of indicators associated with the object; upon identifying that an object has an uncertain object type status: determining image data corresponding to the object in the first image; upon the background model defining the image data as belonging to the background in the first image, determining that the object is not an object of the first object type; upon the background model defining the image data as belonging to the foreground in the first image, determining that the object is an object of the first object type.

The method of the second aspect is similar to the method of the first concept, and the same or corresponding advantages may be achieved. A difference is that, in the second aspect, the assessments from the first algorithm is associated with objects detected in the video stream instead of areas of the scene. Advantageously, the method of the second aspect may handle both static and moving objects. Similar to the first aspect, the background model is used to assess if the tracked object having an uncertain object type status is to be considered as a background or foreground in the first image frame. If the image data corresponding to the object is to be considered as a foreground, the object is determined to be of the first object type, and otherwise not.

In some embodiments, each of the tracked objects is located beyond a threshold distance from a camera capturing video sequence of the scene. For example, the first algorithm may have an effective range or detection range within which the first algorithm can accurately classify objects based on their features or characteristics in the image. This range is typically determined by the resolution and quality of the camera, as well as the performance of the object classification algorithm. For objects outside the detection range, the accuracy of the classification may decrease due to factors such as reduced image quality, occlusion, and changes in lighting conditions. The threshold distance may in embodiments be the same as or close to the detection range of the first algorithm. Using the present embodiment, objects that are sometimes classified as the first object type and not considered as a background may be determined to be of the first object type. Consequently, false negatives may be reduced. This may be particularly important in a scenario where objects of the first object type should be masked, e.g., for privacy reasons.

The second aspect may generally have the same features and advantages as the first aspect.

According to a third aspect of the present invention, there is provided a non-transitory computer-readable storage medium having stored thereon instructions for implementing the method according to the first or second aspect when executed on a device having processing capabilities.

According to a fourth aspect of the present invention, there is provided a system for detecting objects of a first object type in a first image frame of a plurality of image frames in a video sequence capturing a scene, the system comprising: one or more processors; and one or more non-transitory computer-readable media storing computer executable instructions that, when executed by the one or more processors, cause the system to perform the method of the first or the second aspect.

The third and fourth aspect may generally have the same features and advantages as the first aspect.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise.

The steps of any method disclosed herein do not have to be performed in the exact order disclosed, unless explicitly stated.

BRIEF DESCRIPTION OF THE DRAWINGS

The above, as well as additional objects, features, and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Object classification systems may output false positives or false negatives for various reasons, including imbalanced training data, similar object appearances, occlusion, illumination differences, etc. For example, objects with similar visual features or appearances may cause confusion for the classification system, leading to false positives or false negatives. The model may struggle to differentiate between objects with similar shapes, textures, or colours, in particular under certain lighting conditions or from certain viewpoints.

In many object classification systems, in particular such systems where the output is monitored by an operator, consistent false positives or false negatives may be disregarded by the operator and not take up too much attention. However, inconsistent false positives or false negatives may be more difficult to disregard, and lead to user frustration, decreased trust in the system, and reduced adoption of the technology. Moreover, in real-time applications such as a monitoring application, inconsistent false positives or false negatives may result in erratic decision-making, as the system constantly re-evaluates the presence or absence of objects of a certain object type. This may lead to inefficient or potentially hazardous decisions.

Figure 1:
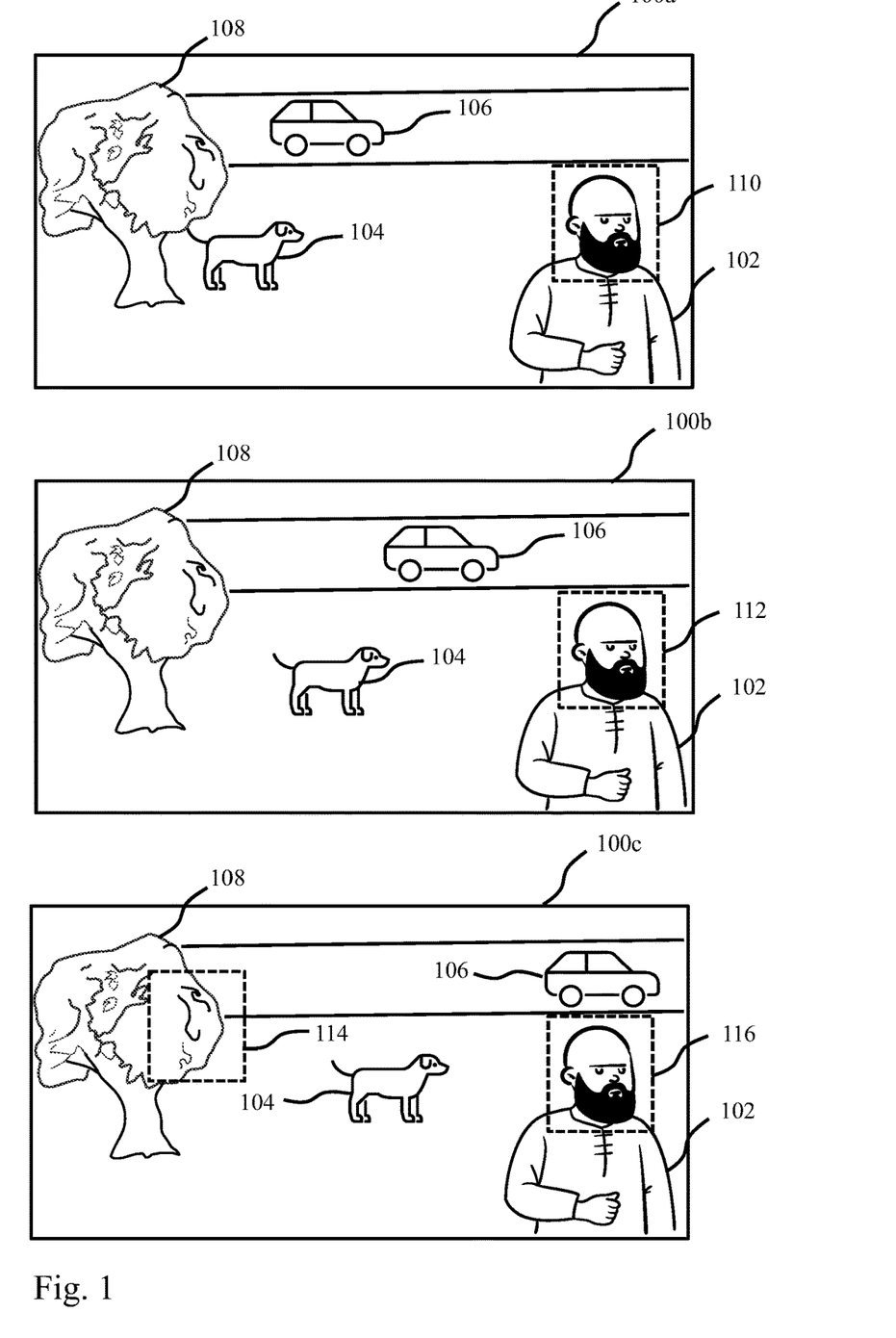
FIG. 1 shows a video sequence comprising a plurality of images in which objects of a first object type are identified by a first algorithm, according to a first embodiment.

FIG. 1 shows an example of a video sequence where an object classification algorithm outputs fluctuating classifications for an object. FIG. 1 shows three images 100a-c from a video sequence capturing a scene. The scene includes four objects, a tree 108, a dog 104, a car 106 driving on a road, and a person 102. The images 100a-c have further been augmented with highlighting features 110, 112, 114, 116 indicating image areas (image data) where a first algorithm has identified objects of the first object type in each of the image frames 100a-c. In the example of FIG. 1, the first algorithm is configured to detect human faces. This detection can serve various purposes, such as monitoring and alerting an operator when individuals enter a restricted area where access is prohibited, which could also trigger an alarm. Additionally, the face detection can be employed for privacy purposes, enabling masking or blurring of faces to protect individuals' identities. It should be noted that the first algorithm may be configured to detect other object types, such as cars, animals etc., depending on the use case of the object classification system.

The first algorithm may be configured to identify objects of the first object type in an image frame 100a-c by calculating, for each area of a plurality of areas in the scene captured by the image frames 100a-c, a probability of the image data corresponding to the area being part of an object of the first object type in the image frame 100a-c. The first algorithm may have a probability threshold to determine whether image data is part of the object of the first object type or not. The first algorithm may be a machine learning or artificial intelligence model, offering various technical advantages, such as improved accuracy, adaptability to new data, ability to handle complex relationships and scalability. Typically, such algorithms, or other suitable algorithms, classify an object type of an object with a determined probability, for example 0.7, or 0.2 on a scale from 0-1. If the determined probability is exceeding a probability threshold, for example 0.5, the object is determined to be of the corresponding object type, otherwise it is determined to not be of the corresponding object type. The probability threshold may be fixed for all images, or vary based on e.g., the number of objects in an image, quality of the image, lighting conditions of the image, etc.

The first algorithm may comprise a feature extraction process to extract features of objects within an image frame 100a-c and represent them as a vector of numbers, and the vector of numbers (feature vector) may then be used to determine the probability that the image data of the object is part of an object of the first object type in the image frame 100a-c. The location of the objects may be mapped down to areas of the scene. In case the camera capturing the images is a static camera (as in the example of FIG. 1), each area of the scene may be represented by a same pixel index or ranges of pixel indexes in each image frames 100a-c. For a moving camera, motion data may be used in addition to the pixel indexes to determine corresponding pixel areas between the image frames 100a-c. In case image frames 100a-c are captured with a different resolution, scaling parameters may additionally be used to determine corresponding pixel areas between the image frames 100a-c.

However, no matter how well trained the first algorithm may be, the model may anyway struggle to differentiate between objects with similar shapes, textures, or colours, in particular under certain lighting conditions or from certain viewpoints. This is exemplified in FIG. 1 where the image data 114 depicting a of part of the foliage of the tree 108 is interpreted as a human face in the last image 100c of the tree images 100a-c. Apart from this erroneous classification, the first algorithm is correctly interpreting the other areas of the scene as depicted in the three images 100a-c, and only classifies the image data 110, 112, 116 corresponding to the area in which the person 102 resides in the scene as being part of an object of the first object type.

If the output from the first algorithm were the only data source for detecting objects of the first object type, the resulting inconsistent false positives relating to the tree 108 could lead to multiple issues, as previously discussed. The area of the scene corresponding to the foliage of the tree (i.e., the image data 114 depicting such an area in the third image) has an uncertain object type status (as will be discussed more below in conjunction with FIGS. 5-6) in the last image 100c since it is in this image 100c interpreted as a human face but in other images 100a, 100b interpreted to not be a human face. However, as disclosed herein, using a background model to make the final decision for such an area may reduce the problem of inconsistent false positives, and in this case remove false positives in their entirety from the third image frame 100c.

Figure 3:
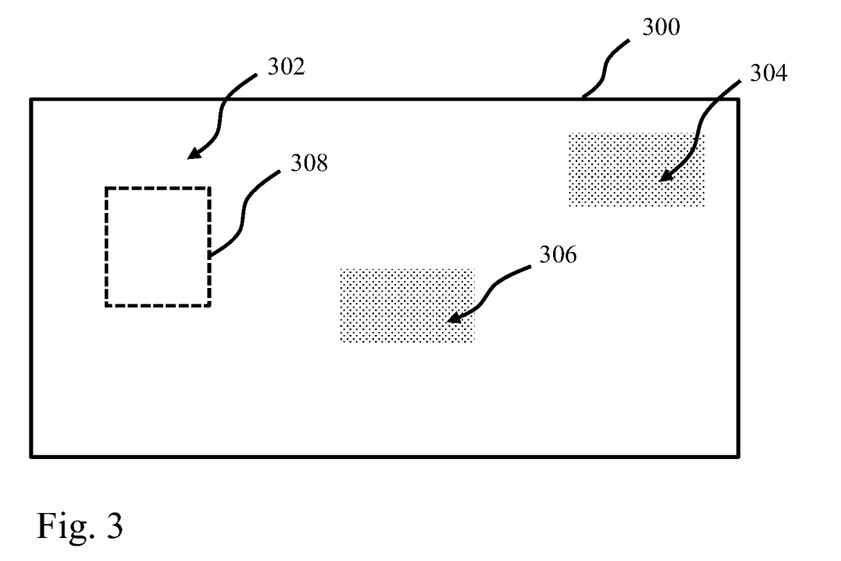
FIG. 3 shows a background model of the video sequence in FIG. 1.

FIG. 3 shows such a background model 300. In the example of FIG. 3, the background model 300 defines, for each area of the plurality of areas in the scene, whether the image data corresponding to the area in the last image frame 100c belongs to a background or a foreground. In the scene of FIG. 1, only the dog 104 and the car 106 moves between the image frames 100a-c. The background model in FIG. 3 schematically defines the areas 304, 306 corresponding to the position of the car 106 and the dog 104 in the last image 100c in FIG. 1 as foreground, and the rest as background 302 but this is just for ease of explanation. The background model may be determined by applying a second algorithm (different from the first) to at least some of the plurality of images. The background model may thus depend on the specifics of the second algorithm. The complexity of the second algorithm may vary, from simplistic frame differencing algorithms to gaussian mixture models taking into account colour and depth information. In case the background model is determined using a different scaling of the scene compared to the image frames 100a-c, scaling parameters may be used to determine corresponding areas between the image frames 100a-c and the background model 300.

If the background model 300 is applied to the image data 114 having an uncertain object type status as disclosed herein, the false classification of the image data provided by the first algorithm may be reverted and the image data may instead be correctly classified as not being part of an object of the first object type (i.e., not being part of a human face). This is because the image data 114 is considered to be part of the background (indicated by the dashed area 308 in FIG. 3, which spatially correspond to the image data 114 as shown in FIG. 1) and consequently determined to not be part of an object of the first object type.

For image data in the last image 100c which is not identified as having an uncertain object type status, such as the image data 116, or image data depicting the dog 104, in the last image 100c of FIG. 3, the output from the first algorithm is relied upon. Consequently, the image data 116 is determined to be part of an object of the first object type (i.e., being part of a human face), whilst the image data depicting the dog is determined to not be part of an object of the first object type.

Figure 2:
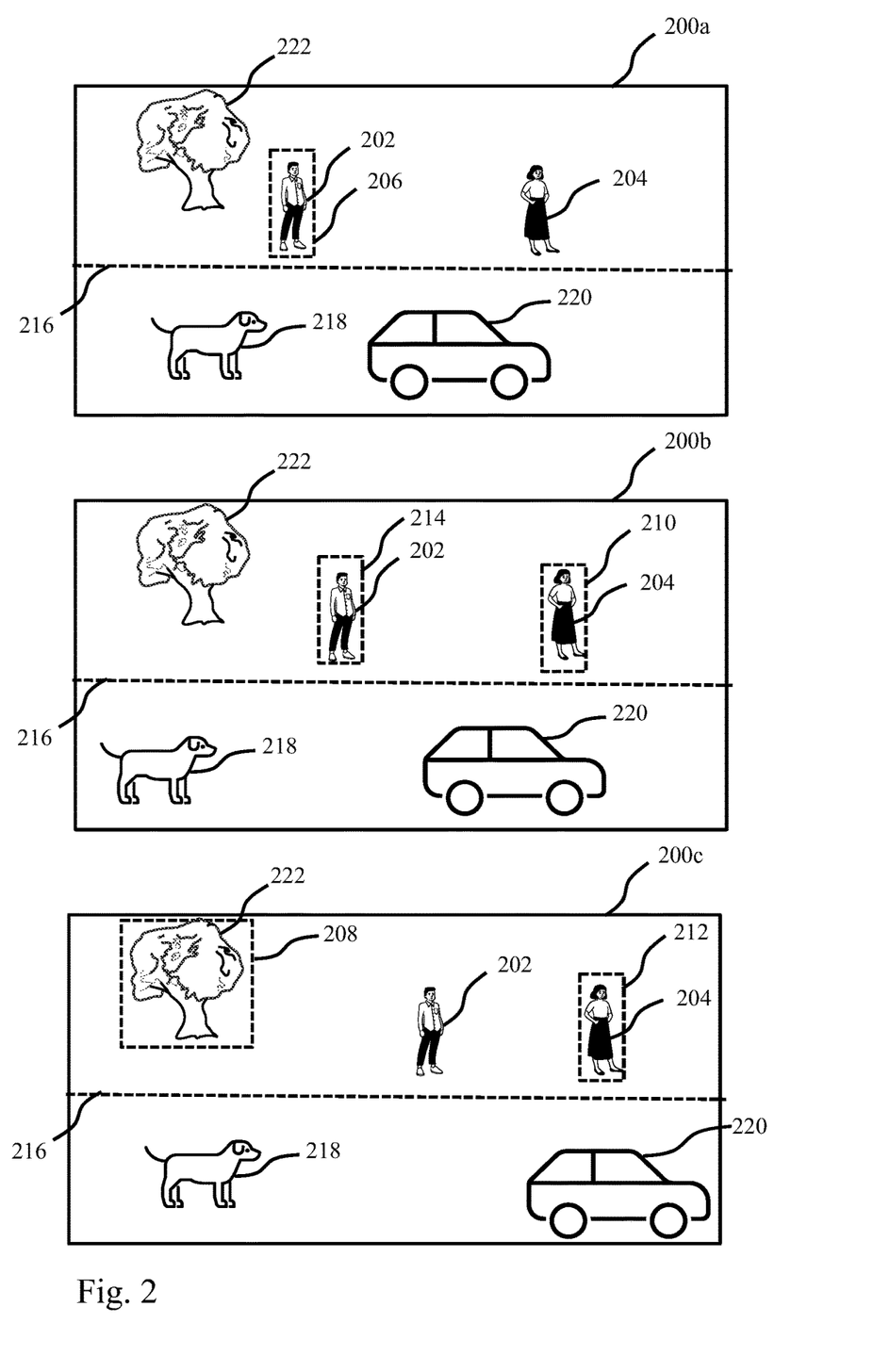
FIG. 2 shows a video sequence comprising a plurality of images in which objects of a first object type are identified by a first algorithm, according to a second embodiment.

FIG. 2 shows another aspect of the techniques described herein, in many respects similar to the aspect described in conjunction with FIG. 1. The second aspect differs from the first in that the assessments made by the first algorithm are associated with objects detected and tracked within the video stream, rather than specific areas of the scene. In other words, the first algorithm focuses on analysing and classifying individual objects within the video, rather than regions or sections of the scene. FIG. 2 shows an example of a video sequence where an object classification algorithm outputs fluctuating classifications for several objects. FIG. 2 shows three images 200a-c from a video sequence capturing a scene. The scene includes five objects, a tree 222, a dog 218, a car 220, and two persons 202, 204. The objects are tracked in the plurality of image frames 100a-c. The images 200a-c have further been augmented with highlighting features 206, 208, 210, 212, 214 indicating objects that the first algorithm has identified as being of the first object type in each of the image frames 100a-c. In the example of FIG. 2, the first algorithm is configured to detect people.

If the output from the first algorithm were the only data source for detecting objects of the first object type, the resulting inconsistent false positives relating to the tree 222, and the inconsistent false negatives relating to the two persons 202, 204 could lead to multiple issues, as previously discussed. These three objects 202, 204, 220 have an uncertain object type status (as will be further discussed below in conjunction with FIGS. 5-6) in the last image 100c since the object type of these objects have been differently assessed throughout the video stream. However, as disclosed herein, using a background model to make the final decision for such objects may reduce the problem of inconsistent false positives and false negatives, and in this case remove false positives and false negatives in their entirety from the third image frame 200c.

Figure 4:
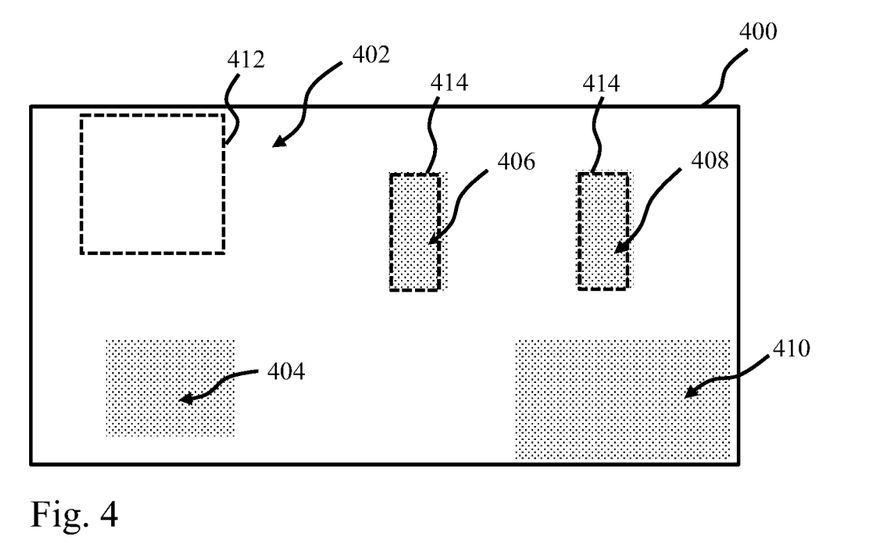
FIG. 4 shows a background model of the video sequence in FIG. 2.

FIG. 4 shows such a background model 400, which is similar to the background model 300 of FIG. 3. In the example of FIG. 4, the background model 400 defines, for each area of the plurality of areas in the scene, whether the image data corresponding to the area in the last image frame 200c belongs to a background or a foreground. In the scene of FIG. 2, the dog 218 and the car 220, and the two persons 202, 204 move between the image frames 100a-c. The background model in FIG. 4 schematically defines the areas 406, 408, 404, 410 corresponding to the position of the two persons 202, 204, the dog 218 and the car 220 in the last image 100c in FIG. 1 as foreground, and the rest as background 402.

If the background model 400 is applied to the tree 222 having an uncertain object type status as disclosed herein, the false classification of the object provided by the first algorithm may be reverted and the object may instead be correctly classified as not being an object of the first object type (i.e., not comprising a human face). This is because the image data corresponding to the tree 222 is considered to be part of the background (indicated by the dashed area 412 in FIG. 4, which spatially correspond to the location and extent of the tree 222 as shown in FIG. 2) in the last image 100c and consequently determined to not be part of an object of the first object type.

If the background model is applied to the persons 202, 204, each having an uncertain object type status as disclosed herein, the missed classification of the object 202 provided by the first algorithm for the last image 200c may be corrected and the object may instead be correctly classified as being an object of the first object type (i.e., comprising a human face). This is because the image data corresponding to each of the persons 202, 204 is considered to be part of the foreground (indicated by the dashed areas 406, 408 in FIG. 4, which spatially correspond to the location and extent of the persons 202, 204 as shown in FIG. 2) in the last image 100c and consequently determined to be part of an object of the first object type.

Moreover, FIG. 2 includes a dashed line 216, representing an effective range or detection range within which the first algorithm can accurately classify objects based on their features or characteristics in the image. In some embodiments, the techniques described above in conjunction with FIG. 2 (assessments made by the first algorithm are associated with objects detected within the video stream, rather than specific areas of the scene as discussed in conjunction with FIG. 1) is applied primarily to objects located beyond a threshold distance from a camera capturing video sequence of the scene. The threshold distance may be set to the same as or similar to the effective range of the first algorithm. Since the moving persons 202, 204 are located beyond this threshold, i.e., beyond the dashed line 216 in FIG. 2, the first algorithm may be less reliable to correctly classify moving objects of the first object type. The present embodiment may thus reduce false negatives as described above.

In some examples, the two aspects of the object detecting techniques described in conjunction with FIGS. 1 and 2 may be combined. For example, the area-based technique may be used for image content on the closer side of the effective range of the first algorithm, while the object-based technique is used for objects detected beyond the effective range of the first algorithm.

Figure 5:
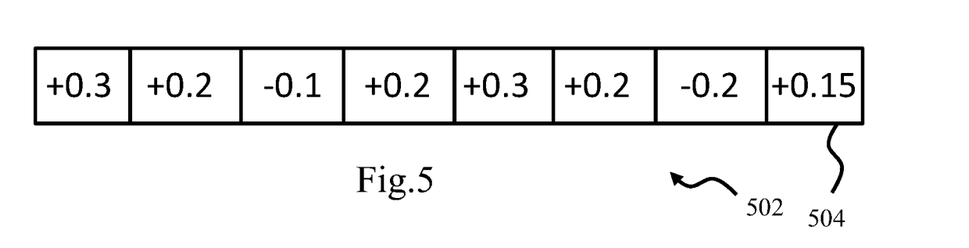
FIG. 5 shows a list of indicators according to embodiments.
Figure 6:
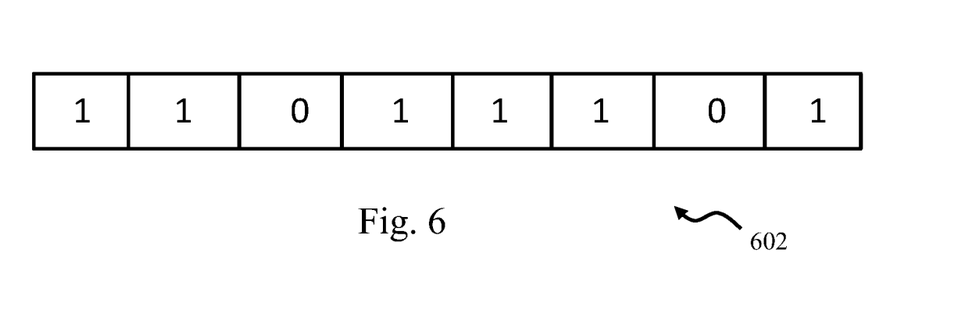
FIG. 6 shows a list of indicators according to embodiments.

FIGS. 5-6 show by way of example two embodiments of lists 502, 602 of indicators produced by the first algorithm when analysing a particular area of the captured scene in a video sequence, or when analysing a particular object tracked in the video sequence. As discussed above, the first algorithm may be configured, in the area-based approach, for each area in each image, to store an indicator of a difference between the probability of the image data (depicting the area in the currently analysed image) being part of an object of the first object type and the probability threshold in a list of indicators associated with the area. In the object-based approach, the first algorithm may be configured to, for each tracked object in each image, store an indicator of a difference between the probability of the object being an object of the first object type and the probability threshold in a list of indicators associated with the object.

Independently of the which approach is used, each area or each object may be associated with a list 502, 602 as shown in FIG. 5 or 6. Each cell in each list 502, 602 represents an output from the first algorithm when analysing an image among a plurality of images. The lists 502, 602 in FIGS. 5-6 include X=8 cells, which indicates that 8 images have been analysed. In some embodiments, the list of indicators associated with an area, or an object is a FIFO-list with 5-15 values. In other embodiments, the lists have 15-30 values. Any suitable number of values may be used, dependent on the use case, for example based on the frame rate of the camera capturing the video sequence. When a new image is analysed, the oldest value in the list of indicators (the leftmost one in these examples) are deleted and a new value is inserted in the end of the list. As such, the list may always contain the values from the X latest analysed images in the video stream.

FIG. 5 shows a list 502 in which each indicator indicates how far from the probability threshold the assessment of the probability that the area/object being of the first object type is. In FIG. 1, a positive number indicates that the assessed probability is higher than the threshold (which means that the first algorithm assessed the area/object to be of the first object type). A negative number indicates that the assessed probability is lower than the threshold (which means that the first algorithm assessed the area/object to not be of the first object type). A zero may be counted as a positive number. The probability ranges between 0-1, and the probability threshold is 0.5, meaning that the values of the cells may range from −0.5 to +0.5. Other scales and thresholds may apply.

The list of indicators 502 may be used to determine if the area/object in the last image among the plurality of images which the list of indicators represent has an uncertain object type status. In other words, for a particular image, the result from that particular image in combination with the results from the previous X−1 images in the video stream are used to determine if the area/object in the particular image has an uncertain object type status or not.

In one embodiment, the process of determining an uncertain object type status for an area/object of the last image frame comprises first checking how certain the first algorithm is when assessing if the area/object (as depicted in the last image frame) is of the first object type or not. In case the first algorithm is certain enough, the result from the first algorithm is relied upon. In FIG. 5, the value of the cell 504 corresponding to the last image frame is +0.15. This mean that the assessed probability is 0.65. In case this is counted as certain enough (the absolute value of the difference between the probability that the image data is part of an object of the first object type and the probability threshold exceeds a threshold difference), it is determined that the object/area to which the list 502 is associated is indeed of the first object type. In case it is not enough certainty, or if the embodiment of first checking the probability of the last image frame is not used, further analysis of the list 502 is required.

The analysis of a list may comprise determining a distribution measurement between the indicators in the associated list of indicators that indicates a positive difference, and the indicators in the associated list of indicators that indicates a negative difference. The distribution measurement may comprise any suitable statistical method such as mean (0.13 in the example of FIG. 3), median (0.2), or distribution in percentage between positive and negative values (75/25). If the distribution measurement indicates a mix of positive and negative differences included in an uncertainty range, the area/object in the last image is determined to have an uncertain object type status, and otherwise not. As discussed above, since the list comprises positive and negative numbers, the uncertainty range typically comprises a threshold both on the negative side and on the positive side. The first algorithm may thus be considered as providing consistent enough assessments both for negative assessments as well as for positive assessments. Consequently, in the case of FIG. 5, the uncertainty range is between a negative number and a positive number if mean and median is used (e.g., mean or median between −0.2 to +0.2 results in that the area/object of the first image data is determined to have an uncertain object type status). For distributions (without considering the size of the values), the uncertainty range may for example indicate a mix between a 20/80 distribution and an 80/20 distribution of the indicators that indicates a positive difference, and the indicators that indicates a negative difference. Since the distribution of the list in FIG. 5 falls within this range (being 75/25), the result may be that the area/object associated with the list 502 is considered as having an uncertain object type status.

In some embodiments, the list of indicators is a list of binary values, wherein a positive difference is indicated by a first value of a binary value, and a negative difference is indicated by a second value of a binary value. This is shown in FIG. 6 which corresponds to the list 502 of FIG. 5 but in a binary format instead. The same distribution measurements may apply, such as mean (0.6) and distribution in percentage between positive and negative values (75/25) and the uncertainty range may need to be adjusted according to the binary format compared to the format as shown in FIG. 5.

Figure 7:
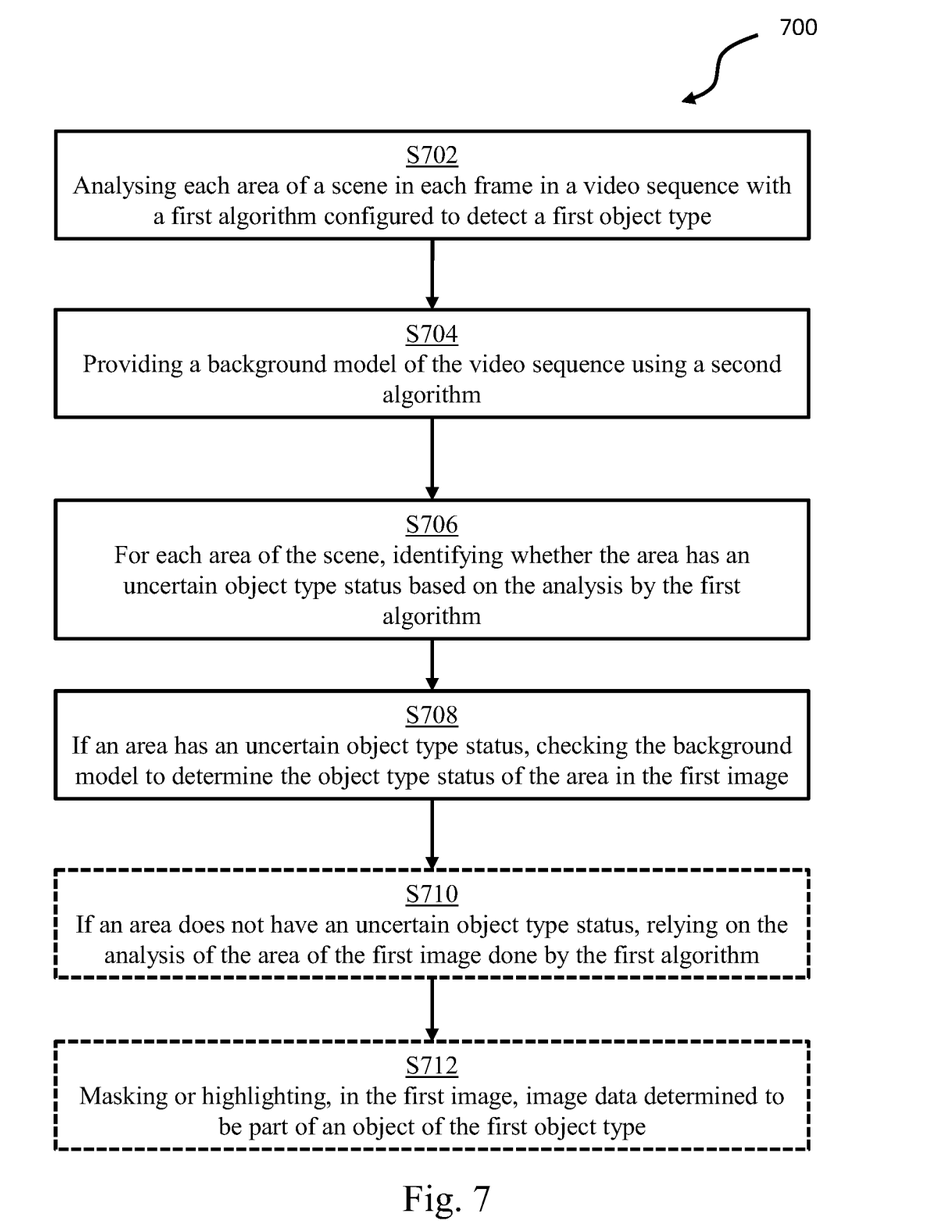
FIG. 7 shows a flow chart of a method for detecting objects of a first object type in a first image frame of a plurality of image frames, according to embodiments.
Figure 8:
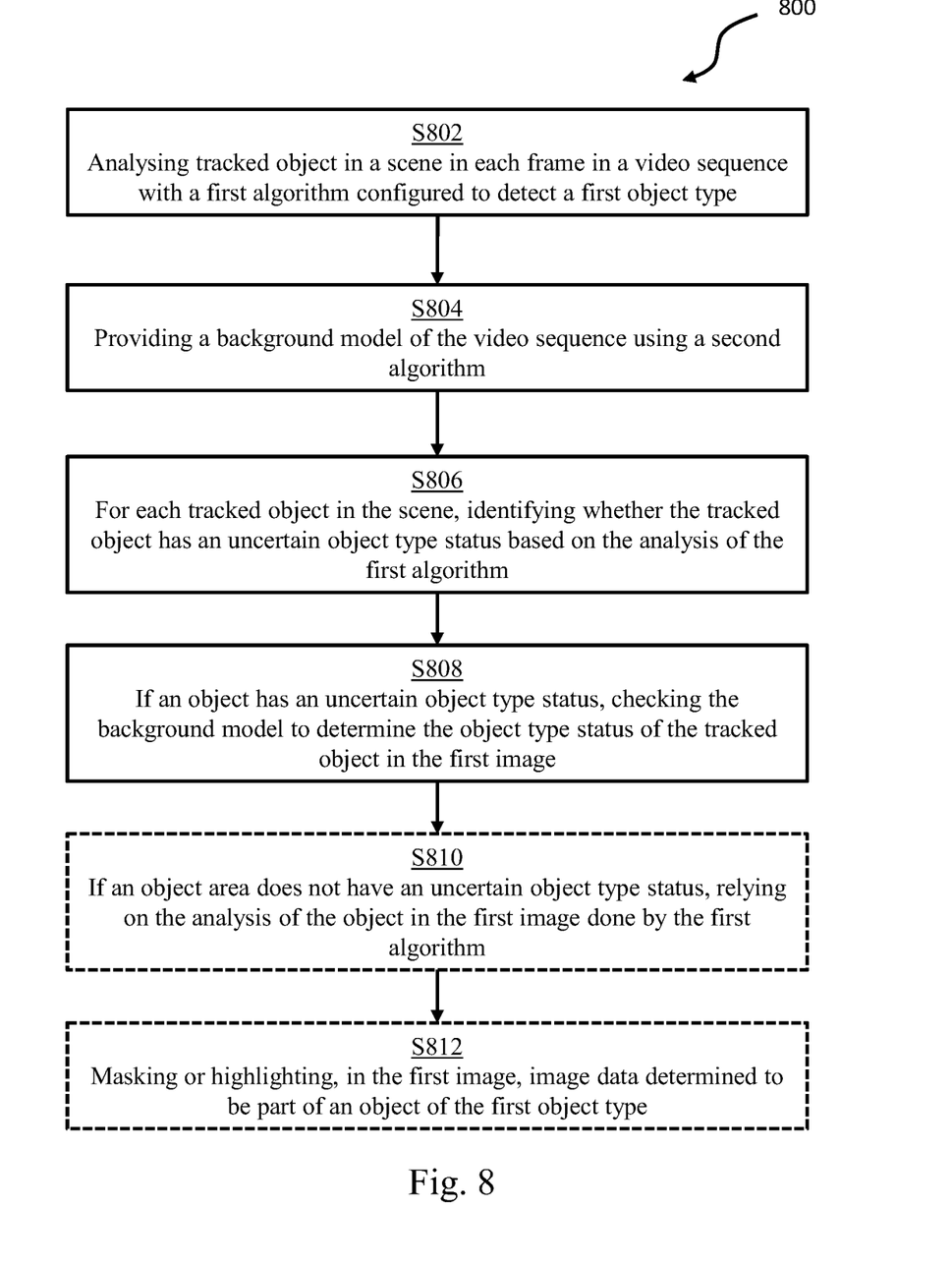
FIG. 8 shows a flow chart of a method for detecting objects of a first object type in a first image frame of a plurality of image frames, according to embodiments.

FIGS. 7-8 show flow charts of two method for detecting objects of a first object type in a first image frame of a plurality of image frames, according to the first and second aspect discussed herein. FIG. 7 corresponds to the area-based aspect, and FIG. 8 to the object-aspect.

FIG. 7 shows a method 700 for detecting objects of a first object type in a first image frame of a plurality of image frames in a video sequence capturing a scene. The method comprises analysing S702 each area of a scene in each image frame in a video sequence with a first algorithm configured to detect a first object type. Put differently, the method 700 may comprise for each image frame of the plurality of image frames: analysing the image frame using a first algorithm to identify objects of the first object type in the image frame, the first algorithm calculating, for each area of a plurality of areas in the scene, a probability of the image data corresponding to the area being part of an object of the first object type in the image frame, the first algorithm having a probability threshold to determine whether image data is part of the object of the first object type. An indicator of a difference between the probability of the image data being part of an object of the first object type and the probability threshold is then stored in a list of indicators associated with the area.

The method further comprises, when detecting objects of the first object type in a last image frame among the plurality of image frames, providing S704 a background model of the video sequence using a second algorithm. The background model may define, for each area of the plurality of areas in the scene, whether the image data corresponding to the area in the first image frame belongs to a background or a foreground.

The method further comprises, for each area of the scene, identifying S706 whether the image data corresponding to the area has an uncertain object type status based on the analysis by the first algorithm. The uncertain object type status may be based on the associated list of indicators.

The method further comprises, if an area (i.e., the image data corresponding to the area) has an uncertain object type status, checking S708 the background model to determine the object type status of the area of the first image. The background model may be used such that, upon the background model defining the image data as belonging to the background in the first image, determining that the image data is not part of an object of the first object type, and upon the background model defining the image data as belonging to the foreground in the first image, determining that the image data is part of an object of the first object type.

In some examples, if an area (i.e., the image data corresponding to the area) does not have an uncertain object type status, the analysis of the area of the first image done by the first algorithm is relied on S710. This may mean that, upon the first algorithm determining that the image data is part of the object of the first object type, determining that the image data is part of an object of the first object type, and upon the first algorithm determining that the image data is not part of the object of the first object type, determining that the image data is not part of an object of the first object type.

In some examples, the method comprises masking or highlighting S712, in the first image, image data determined to be part of an object of the first object type.

FIG. 8 shows a method 800 for detecting objects of a first object type in a first image frame of a plurality of image frames in a video sequence capturing a scene, the scene comprising a plurality of objects tracked in the plurality of image frames.

The method 800 comprises, analysing S802 tracked objects in a scene in each frame in a video sequence with a first algorithm configured to detect a first object type. Put differently, the method 800 may comprise for each image frame of the plurality image frames: analysing the image frame using a first algorithm to identify objects of the first object type in the image frame, the first algorithm calculating, for each object of the plurality of objects tracked in the image frame, a probability of the object being an object of the first object type, the first algorithm having a probability threshold to determine whether the object is an object of the first object type. An indicator of a difference between the probability of the image data being part of an object of the first object type and the probability threshold is then stored in a list of indicators associated with the object.

The method further comprises, when detecting objects of the first object type a last image frame among the plurality of image frames, providing S804 a background model of the video sequence using a second algorithm. The background model may define, for each area of the plurality of areas in the scene, whether the image data corresponding to the area in the first image frame belongs to a background or a foreground.

The method further comprises, for each tracked object in the scene, identifying S806 whether the tracked object has an uncertain object type status based on the analysis of the first algorithm. The uncertain object type status may be based on the associated list of indicators.

The method further comprises: if an object has an uncertain object type status, checking S808 the background model to determine the object type status of the tracked object in the first image. The background model may be used such that, upon the background model defining that image data corresponding to the object in the last image of the video sequence belongs to the background in the first image, determining that the object is not an object of the first object type, and upon the background model defining the image data as belonging to the foreground in the first image, determining that the object is an object of the first object type;

In some examples, if an object does not have an uncertain object type status, the analysis of the object of the first image done by the first algorithm is relied on S810. This may mean that, upon the first algorithm determining that the object is of the first object type, determining that the object is of the first object type, and upon the first algorithm determining that the object is not of the first object type, determining that the object is not of the first object type.

In some examples, the method comprises masking or highlighting S812, in the first image, an object determined to be of the first object type.

The methods shown in FIGS. 7-8, as well as any other methods or functionality described herein, may be stored on a non-transitory computer-readable storage medium as instructions, such that the methods is implemented when the instructions are executed on a device or system having processing capabilities. Such device or system may comprise one or more processors. The features and methods described herein can thus be implemented advantageously in one or more computer programs that are executable on a programmable system that may include at least one programmable processor coupled to receive data and instructions from, and to transmit data and instructions to, a data storage system, at least one input device such as a camera for capturing the image frames/video sequence, and at least one output device such as a display to display the images, potentially masked or highlighted as described herein. Suitable processors for the execution of a program of instructions include, by way of example, both general and special purpose microprocessors, and the sole processor or one of multiple processors or cores, of any kind of computer. The processors can be supplemented by, or incorporated in, ASICs (application-specific integrated circuits).

The above embodiments are to be understood as illustrative examples of the invention. Further embodiments of the invention are envisaged. For example, the techniques described herein may be employed in any suitable object classification systems, for example used in autonomous vehicles, sports analysis, surveillance and security and weather forecasting. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Enumerated List of Embodiments

A. A method for detecting objects of a first object type in a first image frame of a plurality of image frames in a video sequence capturing a scene, the method comprising:
   for each image frame of the plurality of image frames:
      analysing the image frame using a first algorithm to identify objects of the first object type in the image frame, the first algorithm calculating, for each area of a plurality of areas in the scene, a probability of the image data corresponding to the area being part of an object of the first object type in the image frame, the first algorithm having a probability threshold to determine whether image data is part of the object of the first object type, and storing an indicator of a difference between the probability of the image data being part of an object of the first object type and the probability threshold in a list of indicators associated with the area;
   detecting objects of the first object type in the first image frame, the first image frame being a last image frame among the plurality of image frames, wherein the detecting comprises:
      providing a background model of the video sequence, the background model defining, for each area of the plurality of areas in the scene, whether the image data corresponding to the area in the first image frame belongs to a background or a foreground, the background model being defined by applying a second algorithm different to the first algorithm to at least some of the plurality of image frames;
      for each area of the scene, identifying whether the image data corresponding to the area has an uncertain object type status in the first image based on the associated list of indicators;
      upon identifying that an image data has an uncertain object type status,
         upon the background model defining the image data as belonging to the background in the first image, determining that the image data is not part of an object of the first object type;
         upon the background model defining the image data as belonging to the foreground in the first image, determining that the image data is part of an object of the first object type.

B. The method of embodiment A, further comprising the steps of:
   upon identifying an image data as not having an uncertain object type status:
      upon the first algorithm determining that the image data is part of the object of the first object type, determining that the image data is part of an object of the first object type;
      upon the first algorithm determining that the image data is not part of the object of the first object type, determining that the image data is not part of an object of the first object type.

C. The method of any one of embodiments A-B, wherein the step of identifying whether the image data has an uncertain object type status in the first image comprises:
   determining, based on the associated list of indicators, whether an absolute value of the difference between the probability of the image data is part of an object of the first object type and the probability threshold exceeds a threshold difference;
   upon the absolute value of the difference exceeding the threshold difference, determining that the image data does not have an uncertain object type status;
   upon the difference not exceeding the threshold distance, determining a distribution measurement between the indicators in the associated list of indicators that indicates a positive difference, and the indicators in the associated list of indicators that indicates a negative difference;
   upon the distribution measurement indicating a mix of positive and negative differences included in an uncertainty range, determining that the image data has an uncertain object type status, and otherwise determining that the image data does not have an uncertain object type status.

D. The method of any one of embodiments A-B, wherein the step of identifying whether the image data has an uncertain object type status in the first image comprises:

determining a distribution measurement between the indicators in the associated list of indicators that indicates a positive difference, and the indicators in the associated list of indicators that indicates a negative difference, upon the distribution measurement indicating a mix of positive and negative differences included in an uncertainty range, determining that the image data having an uncertain object type status, and otherwise determining that the image data does not have an uncertain object type status.

E. The method of embodiment D, wherein the list of indicators is a list of binary values, wherein a positive difference is indicated by a first value of a binary value, and a negative difference is indicated by a second value of a binary value.

F. The method of any one of embodiments C-E, wherein the uncertainty range indicates a mix between a 20/80 distribution and an 80/20 distribution of the indicators that indicate a positive difference, and the indicators that indicate a negative difference.

G. The method of any one of embodiments A-E, wherein the first algorithm comprises a feature extraction process to extract features of objects within an image and represent them as a vector of numbers.

H. The method of any one of embodiments A-G, wherein the second algorithm is a motion-based background detection algorithm.

I. The method of any one of embodiments A-H, wherein the list of indicators associated with an area is a FIFO-list with 5-15 values.

J. The method of any one of embodiments A-I, further comprising masking or highlighting, in the first image, image data determined to be part of an object of the first object type.

K. The method of any one of embodiments A-J, implemented in a camera, wherein the video sequence is part of a live video stream captured by the camera.

L. A method for detecting objects of a first object type in a first image frame of a plurality of image frames in a video sequence capturing a scene, the scene comprising a plurality of objects tracked in the plurality of image frames, the method comprising:

for each image frame of the plurality of image frames:
analysing the image frame using a first algorithm to identify objects of the first object type in the image frame, the first algorithm calculating, for each object of the plurality of objects tracked in the image frame, a probability of the object being an object of the first object type, the first algorithm having a probability threshold to determine whether the object is an object of the first object type, and storing an indicator of a difference between the probability of the object being an object of the first object type and the probability threshold in a list of indicators associated with the object;

detecting objects of the first object type in the first image frame, the first image frame being a last image frame among the plurality of image frames, wherein the detecting comprises:

providing a background model of the video sequence, the background model defining, for each area of a plurality of areas in the scene, whether the image data corresponding to the area in the first image frame belongs to a background or a foreground, the background model being defined by applying a second algorithm different to the first algorithm to at least some of the plurality of image frames;

for each object of the plurality of objects tracked in the first image, identifying whether the object has an uncertain object type status based on the list of indicators associated with the object;

upon identifying that an object has an uncertain object type status,
determining image data corresponding to the object in the first image;
upon the background model defining the image data as belonging to the background in the first image, determining that the object is not an object of the first object type;
upon the background model defining the image data as belonging to the foreground in the first image, determining that the object is an object of the first object type;

M. The method of embodiment L, wherein each of the tracked objects is located beyond a threshold distance from a camera capturing the video sequence of the scene.

N. The method of any one of embodiments L-M, further comprising the steps of:
upon identifying an object as not having an uncertain object type status,
upon the first algorithm determining that the object being an object of the first object type, determining that the object is an object of the first object type;
upon the first algorithm not determining that the object being an object of the first object type, determining that the object is not an object of the first object type;

O. The method of any one of embodiments L-N, wherein the step of identifying whether the object has an uncertain object type status comprises:
determining, based on the associated list of indicators, whether an absolute value of the difference between the probability of the object being an object of the first object type in the first image and the probability threshold exceeds a threshold difference;
upon the absolute value of the difference exceeding the threshold difference, determining that the object does not have an uncertain object type status;
upon the difference not exceeding the threshold distance, determining a distribution measurement between the indicators in the associated list of indicators that indicates a positive difference, and the indicators in the associated list of indicators that indicates a negative difference;
upon the distribution measurement indicating a mix of positive and negative differences included in an uncertainty range, determining that the object has an uncertain object type status, and otherwise determining that the object does not have an uncertain object type status.

P. The method of any one of embodiments L-N, wherein the step of identifying whether the object has an uncertain object type status comprises:
determining a distribution measurement between the indicators in the associated list of indicators that indicates a positive difference, and the indicators in the associated list of indicators that indicates a negative difference;

upon the distribution measurement indicating a mix of positive and negative differences included in an uncertainty range, determining that the object having an uncertain object type status, and otherwise determining that the object does not have an uncertain object type status.

Q. The method of embodiment P, wherein the list of indicators is a list of binary values, wherein a positive difference is indicated by a first value of a binary value, and a negative difference is indicated by a second value of a binary value.

R. The method of any one of embodiments O-Q, the uncertainty range indicates a mix between a 20/80 distribution and an 80/20 distribution of the indicators that indicate a positive difference, and the indicators that indicate a negative difference.

S. The method of any one of embodiments L-R, wherein the first algorithm comprises a feature extraction process to extract features of objects within an image and represent them as a vector of numbers.

T. The method of any one of embodiments L-S, wherein the second algorithm is a motion-based background detection algorithm.

U. The method of any one of embodiments L-T, wherein the list of indicators associated with an object is a FIFO-list with 5-15 values.

V. The method of any one of embodiments L-U, further comprising masking or highlighting, in the first image, an object determined to be of the first object type.

X. The method of any one of embodiments L-V, implemented in a camera, wherein the video sequence is part of a live video stream captured by the camera.

Y. A non-transitory computer-readable storage medium having stored thereon instructions for implementing the method according to any one of claims A-K or the method of any one of claims L-X when executed on a device having processing capabilities.

Z. A system for detecting objects of a first object type in a first image frame of a plurality of image frames in a video sequence capturing a scene, the system comprising:
one or more processors; and
one or more non-transitory computer-readable media storing computer executable instructions that, when executed by the one or more processors, cause the system to perform the method of any one of claims A-K or the method of any one of claims L-X.

The invention claimed is:

1. A method for detecting objects of a first object type in a first image frame of a plurality of image frames in a video sequence capturing a scene, the method comprising:
for each image frame of the plurality of image frames:
analysing the image frame using a first algorithm to identify objects of the first object type in the image frame, the first algorithm calculating, for each area of a plurality of areas in the scene, a probability of the image data corresponding to the area being part of an object of the first object type in the image frame, the first algorithm having a probability threshold to determine whether image data is part of the object of the first object type, and storing an indicator of a difference between the probability of the image data being part of an object of the first object type and the probability threshold in a list of indicators associated with the area;
detecting objects of the first object type in the first image frame, the first image frame being a last image frame among the plurality of image frames, wherein the detecting comprises:
providing a background model of the video sequence, the background model defining, for each of the plurality of areas in the scene, whether the image data corresponding to the area in the first image frame belongs to a background or a foreground, the background model being defined by applying a second algorithm, different from the first algorithm, to at least some of the plurality of image frames; and
for each area of the scene, identifying whether the image data corresponding to the area in the first image has an uncertain object type status based on the plurality of indicators in the associated list of indicators, the list of indicators comprising a distinct indicator for each image frame of the plurality of image frames;
upon identifying that an image data has an uncertain object type status:
upon the background model defining the image data as belonging to the background in the first image, determining that the image data is not part of an object of the first object type; or
upon the background model defining the image data as belonging to the foreground in the first image, determining that the image data is part of an object of the first object type.

2. The method of claim 1, further comprising the steps of:
upon identifying an image data as not having an uncertain object type status:
upon the first algorithm determining that the image data is part of the object of the first object type, determining that the image data is part of an object of the first object type; or
upon the first algorithm determining that the image data is not part of the object of the first object type, determining that the image data is not part of an object of the first object type.

3. The method of claim 1, wherein the step of identifying whether the image data has an uncertain object type status in the first image comprises:
determining, using the indicator from the associated list of indicators indicating the difference between the probability of the image data being part of an object of the first object type and the probability threshold, whether an absolute value of the difference between the probability that the image data is part of an object of the first object type and the probability threshold exceeds a threshold difference;
upon the absolute value of the difference exceeding the threshold difference, determining that the image data does not have an uncertain object type status;
upon the difference not exceeding the threshold distance, determining a distribution measurement, by applying a statistical method, between the indicators in the associated list of indicators that indicates a positive difference, and the indicators in the associated list of indicators that indicates a negative difference; or
upon the distribution measurement indicating a mix of positive and negative differences included in an uncertainty range, determining that the image data has an uncertain object type status, and otherwise determining that the image data does not have an uncertain object type status, wherein the uncertainty range comprising an upper and a lower threshold, the upper and lower thresholds defining statistical measures according to the statistical method.

4. The method of claim 1, wherein the step of identifying whether the image data has an uncertain object type status in the first image comprises:
   determining a distribution measurement between the indicators in the associated list of indicators that indicates a positive difference, and the indicators in the associated list of indicators that indicates a negative difference, and
   upon the distribution measurement indicating a mix of positive and negative differences included in an uncertainty range, determining that the image data has an uncertain object type status, and otherwise determining that the image data does not have an uncertain object type status.

5. The method of claim 4, wherein the list of indicators is a list of binary values, wherein a positive difference is indicated by a first value of a binary value, and a negative difference is indicated by a second value of a binary value.

6. The method of claim 3, wherein the uncertainty range indicates a mix between a 20/80 distribution and an 80/20 distribution of the indicators that indicate a positive difference, and the indicators that indicate a negative difference.

7. The method of claim 1, wherein the first algorithm comprises a feature extraction process to extract features of objects within an image and represent them as a vector of numbers.

8. The method of claim 1, wherein the second algorithm is a motion-based background detection algorithm.

9. The method of claim 1, wherein the list of indicators associated with an area is a FIFO-list with 5-15 values.

10. The method of claim 1, further comprising masking or highlighting, in the first image, image data determined to be part of an object of the first object type.

11. The method of claim 1, further being implemented in a camera, wherein the video sequence is part of a live video stream captured by the camera.

12. A method for detecting objects of a first object type in a first image frame of a plurality of image frames in a video sequence capturing a scene, the scene comprising a plurality of objects tracked in the plurality of image frames, the method comprising:
   for each image frame of the plurality of image frames:
      analysing the image frame using a first algorithm to identify objects of the first object type in the image frame, the first algorithm calculating, for each of the plurality of objects tracked in the image frame, a probability of the object being an object of the first object type, the first algorithm having a probability threshold to determine whether the object is an object of the first object type, and storing an indicator of a difference between the probability of the object being an object of the first object type and the probability threshold in a list of indicators associated with the object;
   detecting objects of the first object type in the first image frame, the first image frame being a last image frame among the plurality of image frames, wherein the detecting comprises:
      providing a background model of the video sequence, the background model defining, for each of a plurality of areas in the scene, whether the image data corresponding to the area in the first image frame belongs to a background or a foreground, the background model being defined by applying a second algorithm different from the first algorithm to at least some of the plurality of image frames; and
      for each of the plurality of objects tracked in the first image frame, identifying whether the object has an uncertain object type status based on the plurality of indicators in the list of indicators associated with the object, the list of indicators comprising a distinct indicator for each image frame of the plurality of image frames;
   upon identifying that an object has an uncertain object type status,
      determining image data corresponding to the object in the first image;
      upon the background model defining the image data as belonging to the background, determining that the object is not an object of the first object type; or
      upon the background model defining the image data as belonging to the foreground, determining that the object is an object of the first object type.

13. The method of claim 12, wherein each of the tracked objects is located beyond a threshold distance from a camera capturing the video sequence of the scene.

14. A non-transitory computer-readable storage medium having stored thereon instructions for implementing a method, when executed on a device having processing capabilities, the method for detecting objects of a first object type in a first image frame of a plurality of image frames in a video sequence capturing a scene, the method comprising:
   for each image frame of the plurality of image frames:
      analysing the image frame using a first algorithm to identify objects of the first object type in the image frame, the first algorithm calculating, for each of a plurality of areas in the scene, a probability of the image data corresponding to the area being part of an object of the first object type in the image frame, the first algorithm having a probability threshold to determine whether image data is part of the object of the first object type, and storing an indicator of a difference between the probability of the image data being part of an object of the first object type and the probability threshold in a list of indicators associated with the area;
   detecting objects of the first object type in the first image frame, the first image frame being a last image frame among the plurality of image frames, wherein the detecting comprises:
      providing a background model of the video sequence, the background model defining, for each of the plurality of areas in the scene, whether the image data corresponding to the area in the first image frame belongs to a background or a foreground, the background model being defined by applying a second algorithm, different from the first algorithm, to at least some of the plurality of image frames; and
      for each area of the scene, identifying whether the image data corresponding to the area in the first image has an uncertain object type status based on the plurality of indicators in the associated list of indicators, the list of indicators comprising a distinct indicator for each image frame of the plurality of image frames;
   upon identifying that an image data has an uncertain object type status:
      upon the background model defining the image data as belonging to the background in the first image, determining that the image data is not part of an object of the first object type; or upon the background model defining the image data as belonging to the foreground in the first image, determining that the image data is part of an object of the first object type.

\* \* \* \* \*